(12) United States Patent
Chiu

(10) Patent No.: US 8,370,615 B2
(45) Date of Patent: Feb. 5, 2013

(54) DEVICE AND METHOD FOR MONITORING HARD DISK TEMPERATURE AND STOPPING OPERATION THEREOF WHEN BIOS CONFIGURATION SETTING HAVING A SELECTED VALUE INDICATING A PREDETERMINED TEMPERATURE

(75) Inventor: Chia-Chang Chiu, Taipei County (TW)

(73) Assignee: Getac Technology Corporation, Hsinchu (TW)

( * ) Notice: Subject to any disclaimer, the term of this patent is extended or adjusted under 35 U.S.C. 154(b) by 462 days.

(21) Appl. No.: 12/633,707

(22) Filed: Dec. 8, 2009

(65) Prior Publication Data

US 2010/0153698 A1 Jun. 17, 2010

(30) Foreign Application Priority Data

Dec. 14, 2008 (DE) .......................... 10 2008 054 601

(51) Int. Cl.
*G06F 15/16* (2006.01)
*G06F 19/00* (2011.01)
*G05B 11/01* (2006.01)
*G11B 5/008* (2006.01)
*G05D 23/00* (2006.01)

(52) U.S. Cl. ............. 713/2; 711/112; 713/310; 709/230; 700/12; 700/153; 360/97.02; 165/287

(58) Field of Classification Search .................. 713/340, 713/320; 361/679; 700/153, 12; 711/112; 210/411; 709/230

See application file for complete search history.

(56) References Cited

U.S. PATENT DOCUMENTS

| | | | |
|---|---|---|---|
| 7,136,247 B2 | 11/2006 | Escobar et al. | |
| 7,577,748 B2 * | 8/2009 | Yoshida | 709/230 |
| 8,200,358 B2 * | 6/2012 | Sendelbach et al. | 700/153 |
| 2002/0104030 A1 * | 8/2002 | Ahn | 713/310 |
| 2003/0191889 A1 * | 10/2003 | Forrer, Jr. | 711/112 |
| 2006/0266510 A1 * | 11/2006 | Nobashi | 165/287 |
| 2007/0012615 A1 * | 1/2007 | Yoshida | 210/411 |
| 2007/0219644 A1 * | 9/2007 | Sonobe | 700/12 |
| 2009/0204839 A1 * | 8/2009 | Gross et al. | 713/340 |
| 2010/0061011 A1 * | 3/2010 | Hsien | 360/97.02 |
| 2010/0220437 A1 * | 9/2010 | Tsukazawa | 361/679.32 |
| 2010/0262849 A1 * | 10/2010 | Chan et al. | 713/320 |

FOREIGN PATENT DOCUMENTS

EP 1566722 A2 8/2005

* cited by examiner

*Primary Examiner* — Thomas Lee
*Assistant Examiner* — Aurel Prifti

(57) ABSTRACT

A hard disk temperature monitoring device for monitoring a temperature of a hard disk in a computer system is provided. A hard disk stores an operating system. A basic input/output system (BIOS) has a setting configuration. When the setting configuration is a first setting value, operation of the hard disk is restored. When the setting configuration is a second setting value, the operation of the hard disk is stopped. A thermal sensor detects a temperature of the hard disk. A keyboard controller (KBC) is electrically connected to the thermal sensor via a data transmission channel for detecting the temperature of the hard disk in real time. If the KBC detects that the temperature of the hard disk rises to a first predetermined temperature, the setting configuration is set to the second setting value, and the BIOS stops the operation of the hard disk according to the second setting value.

20 Claims, 5 Drawing Sheets

DEVICE AND METHOD FOR MONITORING HARD DISK TEMPERATURE AND STOPPING OPERATION THEREOF WHEN BIOS CONFIGURATION SETTING HAVING A SELECTED VALUE INDICATING A PREDETERMINED TEMPERATURE

BACKGROUND OF THE INVENTION

1. Field of Invention

The present invention relates to a temperature monitoring device in a computer system, and more particularly to a hard disk temperature monitoring method.

2. Related Art

Many electronic devices have to be provided with waterproof and dustproof functions, and their casings are generally designed in accordance with ingress protection (IP) ratings as required. Although such electronic devices are waterproof and dustproof, the heat dissipation in the electronic devices is negatively effected.

Taking a tablet PC as an illustration, if the computer system operates at an ambient temperature of 60° C., the actual temperature of a hard disk inside the computer system may be up to 85° C., which exceeds the operating temperature limit of the hard disk. In this case, the computer system may break down (for example, a blue screen may appear). If a user still operates the computer to keep the hard disk working, data in the hard disk may be lost or the hard disk may be damaged.

SUMMARY OF THE INVENTION

Accordingly, an object of the present invention is to provide a device for monitoring a temperature of a hard disk in a computer system, so as to prevent breakdown and data loss from occurring to the computer system due to over-temperature of the hard disk.

To achieve the object, a hard disk temperature monitoring device of the present invention is provided for monitoring a temperature of a hard disk in a computer system. The hard disk temperature monitoring device includes a hard disk, a basic input/output system (BIOS), a thermal sensor, and a keyboard controller (KBC). The hard disk is provided for storing an operating system. The BIOS has a setting configuration. When the setting configuration is a first setting value, operation of the hard disk is restored. When the setting configuration is a second setting value, the operation of the hard disk is stopped. The thermal sensor is provided for detecting a temperature of the hard disk. The KBC is electrically connected to the thermal sensor via a data transmission channel for detecting the temperature of the hard disk in real time. If the KBC detects that the temperature of the hard disk rises to a first predetermined temperature, the setting configuration of the BIOS is set to the second setting value, and the BIOS stops the operation of the hard disk according to the second setting value.

The present invention also provides a hard disk temperature monitoring method for monitoring a temperature of a hard disk in a computer system. The hard disk temperature monitoring method includes the following steps. An operating system is stored in a hard disk. A setting configuration is set in a basic input/output system (BIOS). When the setting configuration is a first setting value, operation of the hard disk is restored. When the setting configuration is a second setting value, the operation of the hard disk is stopped. A thermal sensor is disposed on the hard disk for sensing a temperature of the hard disk. If the temperature of the hard disk rises to a first predetermined temperature, the setting configuration of the BIOS is set to the second setting value, and the operation of the hard disk is stopped according to the second setting value.

DETAILED DESCRIPTION OF THE INVENTION

The present invention will be described with reference to specific embodiments, especially a hard disk temperature monitoring device in a computer system. However, the present invention is also applicable to other types of temperature monitoring devices. The specific embodiments discussed herein are merely intended to illustrate the implementation and use of the present invention, and are not intended to limit the scope of the present invention.

Figure 1:
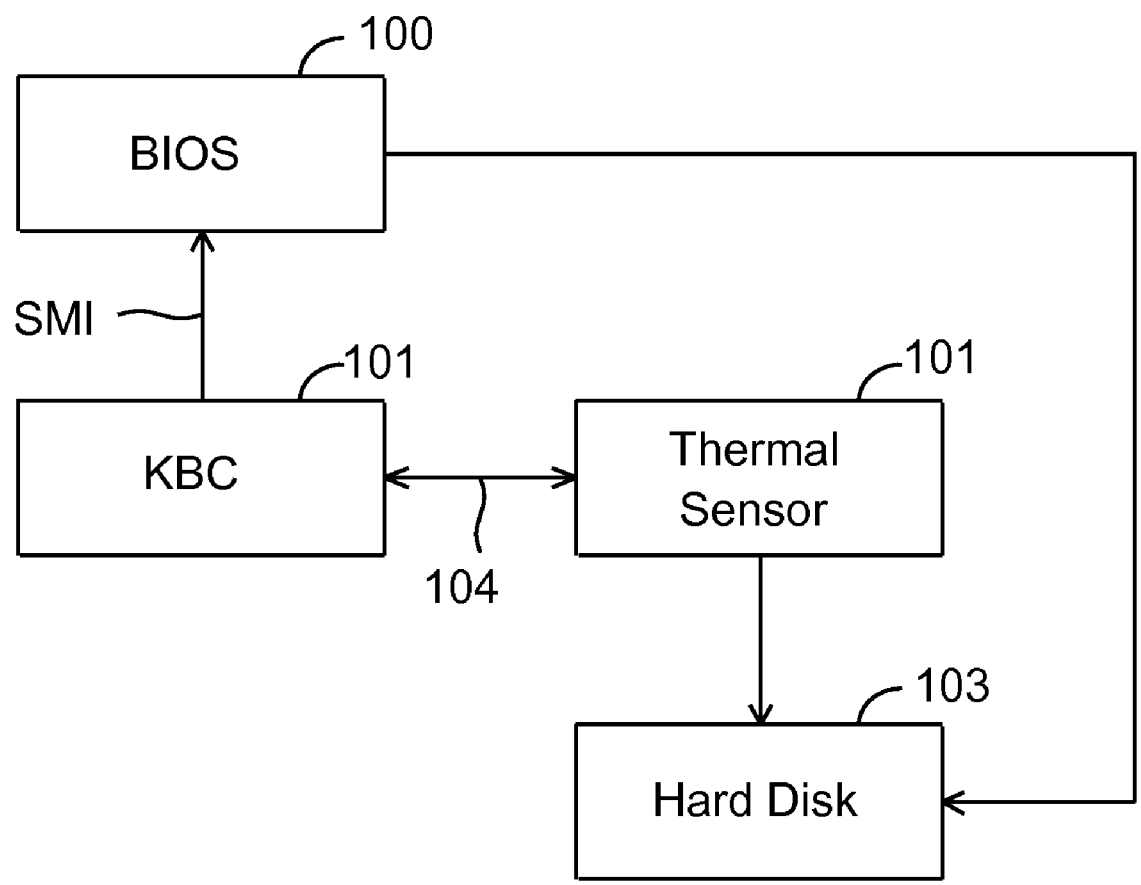
FIG. 1 is a block diagram of a hard disk temperature monitoring device according to an embodiment of the present invention.

FIG. 1 is a block diagram of a hard disk temperature monitoring device 10 according to an embodiment of the present invention. Referring to FIG. 1, the hard disk temperature monitoring device 10 includes a hard disk 103, a basic input/output system (BIOS) 100, a thermal sensor 102, a data transmission channel 104, and a keyboard controller (KBC) 101.

The hard disk 103 is provided for storing an operating system, and the thermal sensor 102 is provided for detecting a temperature of the hard disk 103. The thermal sensor 102 may be disposed in various manners. For example, the thermal sensor 102 may be attached to a surface of the hard disk 103 to detect the temperature of the hard disk 103. The KBC 101 is electrically connected to the thermal sensor 102 via the data transmission channel 104 for detecting the temperature of the hard disk 103 in real time. The data transmission channel 104 may be a system management bus (SM bus), and the KBC 101 may be an embedded controller (EC). In addition, the BIOS 100 has a setting configuration. When the setting configuration is a first setting value, operation of the hard disk 103 is restored. When the setting configuration is a second setting value, the operation of the hard disk 103 is stopped. The first setting value and the second setting value is switched by changing a bit of a port of the BIOS 100 from a first state to a second state, and possible values of the first state and the second state are 0 and 1. For example, a seventh bit of a 6C port of the BIOS 100 is changed from 0 to 1. Moreover, the operation of the hard disk 103 is restored and stopped by restoring and stopping power supply to the hard disk 103. Alternatively, the operation of the hard disk 103 is restored and stopped by restoring and stopping disk rotation of the hard disk 103, and at the same time, the power supply to the hard disk 103 is maintained.

Figure 2:
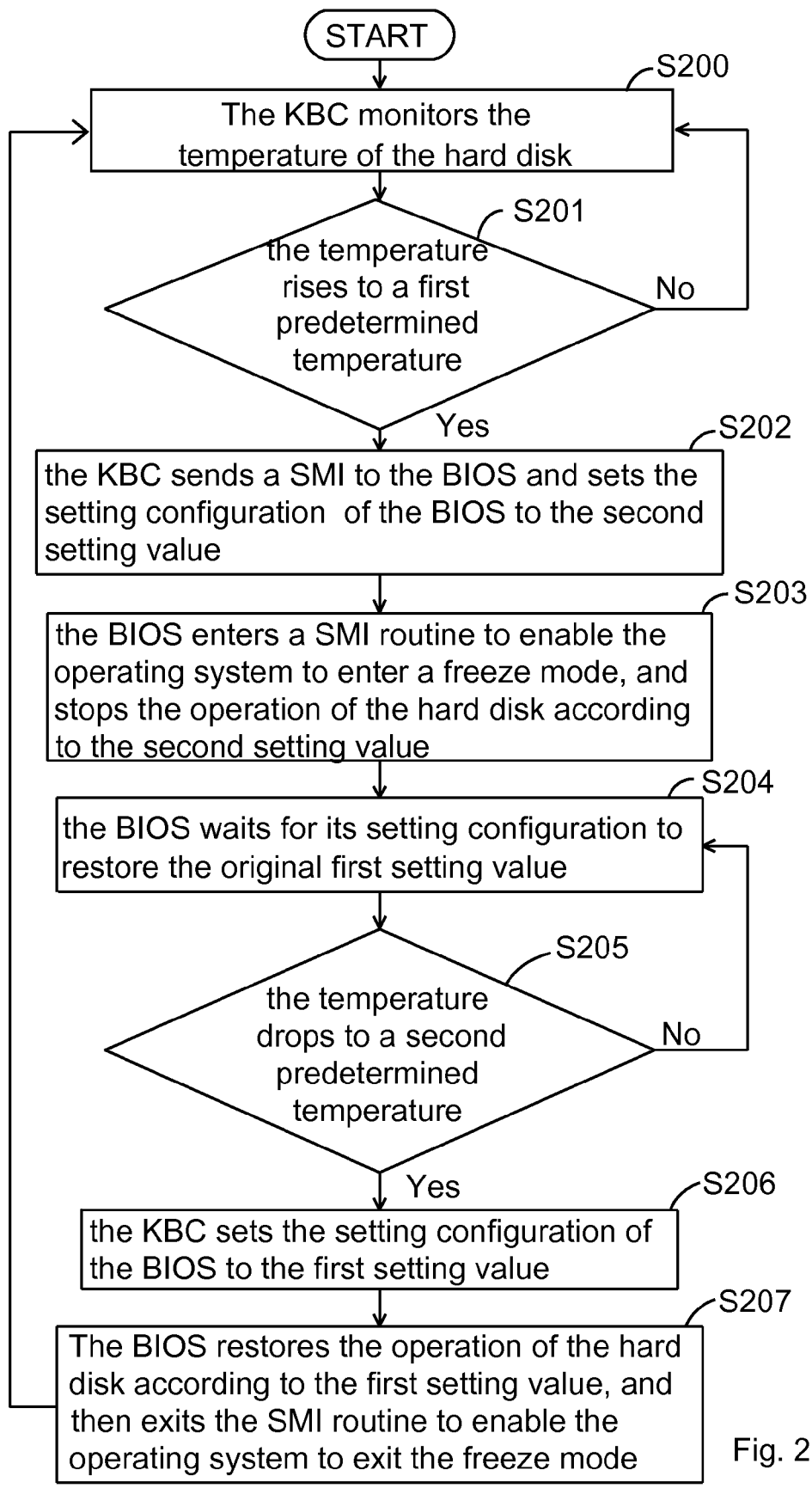
FIG. 2 is a flow chart of the operation of the hard disk temperature monitoring device shown in FIG. 1.

FIG. 2 is a flow chart of operation of the hard disk temperature monitoring device 10 shown in FIG. 1. The KBC 101 monitors the temperature of the hard disk 103 in real time (S200) so as to determine whether the temperature of the hard disk 103 rises to a first predetermined temperature, for example 85° C. (S201). If the temperature of the hard disk 103 does not rise to the first predetermined temperature, return to Step S200 to continue monitoring the temperature of the hard disk 103. If the temperature of the hard disk 103 rises to the first predetermined temperature, the KBC 101 sends an interrupt signal, such as SMI (system management interrupt), to the BIOS 100 and sets the setting configuration of the BIOS 100 to the second setting value (S202). After receiving the interrupt signal SMI, the BIOS 100 enters a system management interrupt routine (SMI routine) so as to enable the operating system to enter a freeze mode, and stops the operation of the hard disk 103 according to the second setting value after all programs are interrupted and the hard disk 130 shows a non-busy state (S203). The operation of the hard disk 103 can be stopped only after all the programs are interrupted to prevent data processed by the programs from being lost or garbled due to the interruption. Therefore, the operation of the hard disk 103 is not stopped until all the programs are interrupted and the data processed the programs is safely transmitted to the hard disk 103. Here, the interrupt signal SMI may be a system management interrupt event (SMI event).

Afterward, the BIOS 100 waits for its setting configuration to restore the original first setting value (S204). The KBC 101 monitors the temperature of the hard disk 103 in real time to determine whether the temperature of the hard disk 103 drops to a second predetermined temperature (S205), for example, 75° C. If the temperature of the hard disk 103 does not drop to the second predetermined temperature, return to Step S204, and the BIOS 100 continues waiting for its setting configuration to restore the original first setting value. If the temperature of the hard disk 103 drops to the second predetermined temperature, the KBC 101 sets the setting configuration of the BIOS 100 to the first setting value (S206). The BIOS 100 restores the operation of the hard disk 103 according to the first setting value, and then exits the SMI routine to enable the operating system to exit the freeze mode (S207) and resume the previously interrupted programs in the case of restoring the operation of the hard disk 103, such that the operating system can read and write the hard disk 103 whose operation is restored in the process of resuming the previously interrupted programs.

Figure 3:
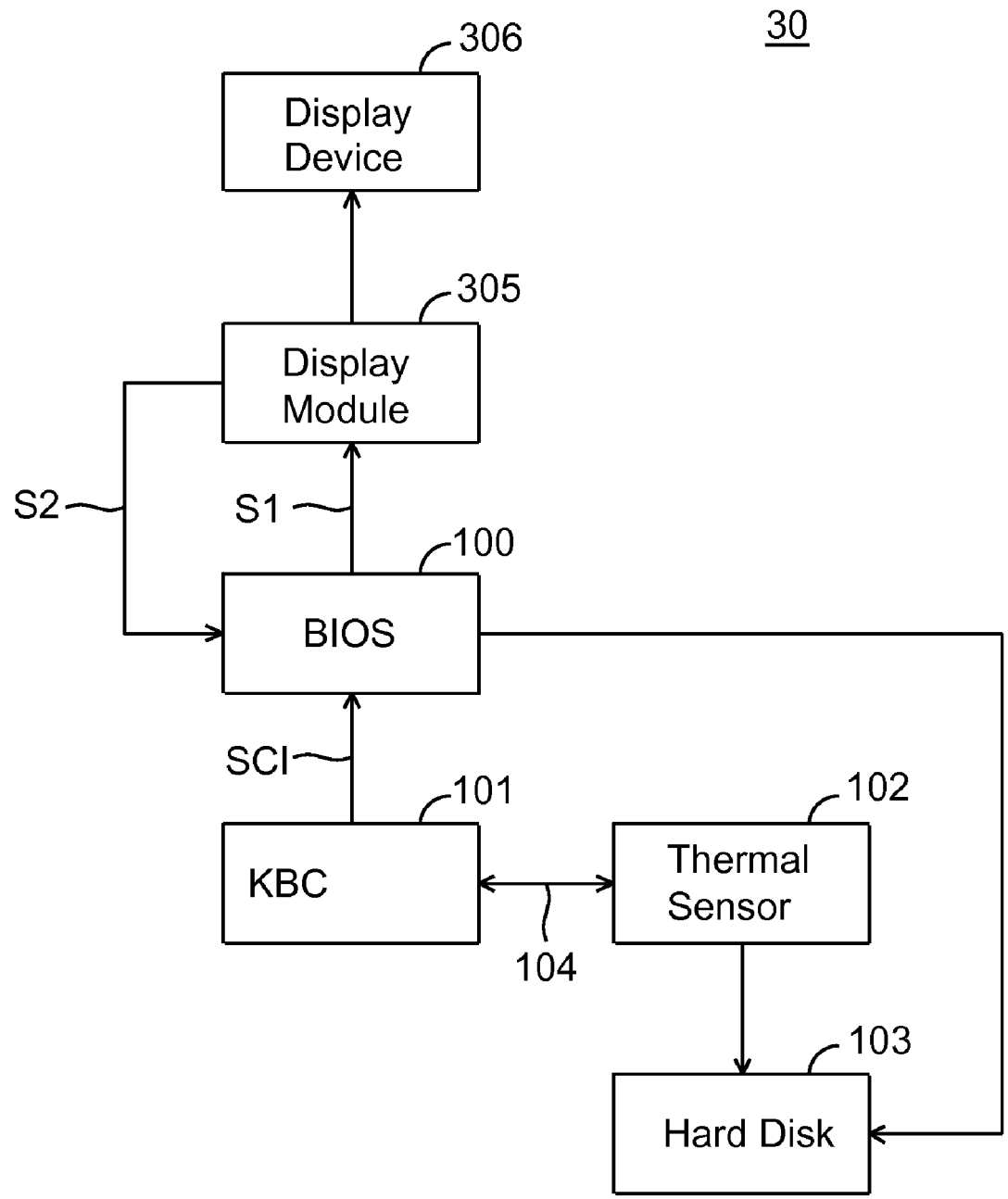
FIG. 3 is a block diagram of a hard disk temperature monitoring device according to another embodiment of the present invention.

FIG. 3 is a block diagram of a hard disk temperature monitoring device 30 according to another embodiment of the present invention. The embodiment shown in FIG. 3 differs from that shown in FIG. 1 only in that a display module 305 and a display device 306 are added. The display module 305 includes an on-screen display (OSD) application for controlling display functions of the screen. The display device 306 is used to display a message to a user.

Figure 4A:
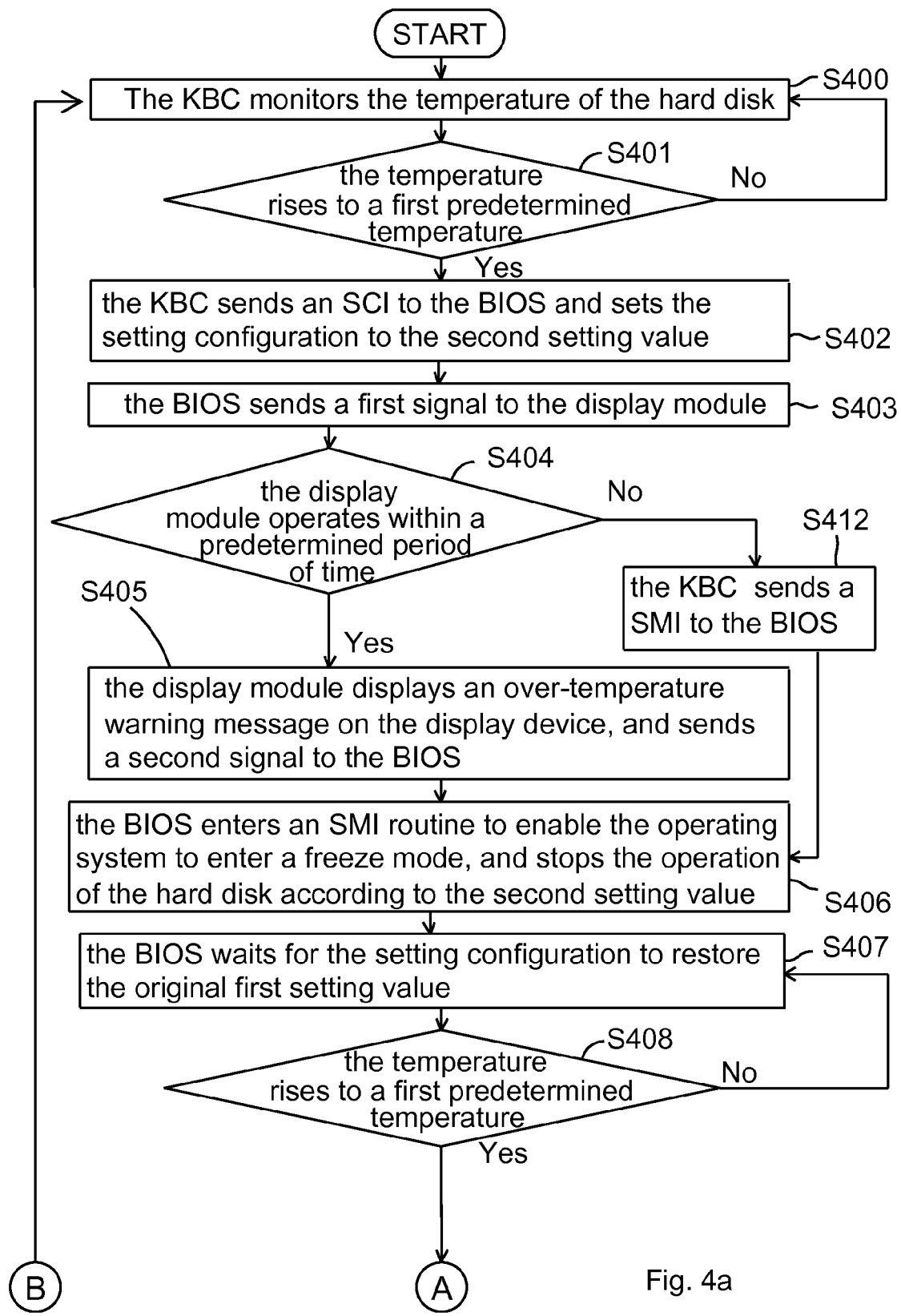
FIGS. 4a and 4b are flow charts of another operation of the hard disk temperature monitoring device shown in FIG. 3.
Figure 4B:
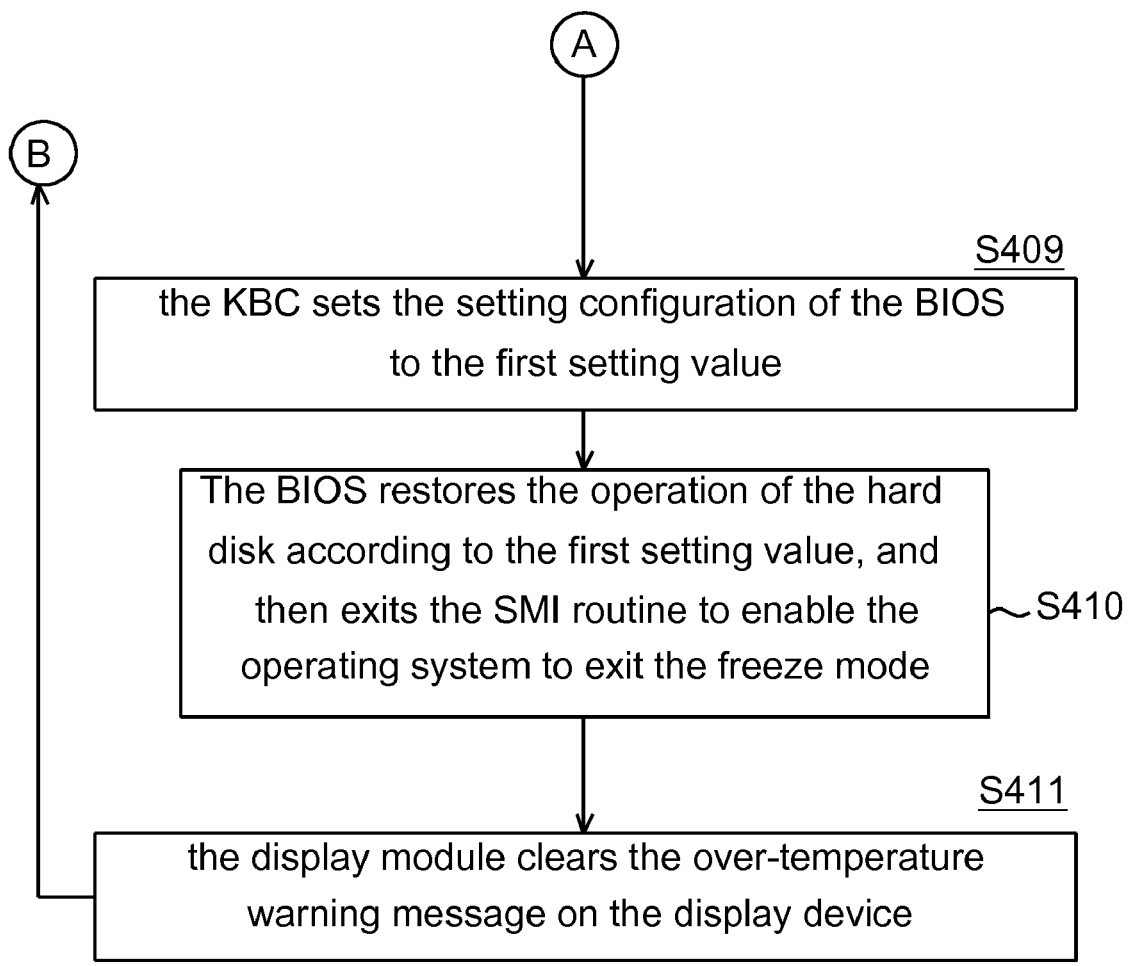

FIGS. 4a and 4b are a flow chart of operation of the hard disk temperature monitoring device 30 shown in FIG. 3. The KBC 101 monitors the temperature of the hard disk 103 in real time (S400) to determine whether the temperature of the hard disk 103 rises to a first predetermined temperature, for example 85° C. (S401). If the temperature of the hard disk 103 does not rise to the first predetermined temperature, return to Step S400 to continue monitoring the temperature of the hard disk 103. If the temperature of the hard disk 103 rises to the first predetermined temperature, the KBC 101 sends an interrupt signal SCI (system control interrupt) to the BIOS 100 and sets the setting configuration of the BIOS 100 to the second setting value (S402). After receiving the interrupt signal SCI, the BIOS 100 sends a first signal 51 to the display module 305 (S403), and determines whether the display module 305 operates within a predetermined period of time (S404). The predetermined period of time is generally 5 seconds. If the display module 305 operates within the predetermined period of time, the display module 305 displays an over-temperature warning message on the display device 306 by means of the OSD to warn and inform the user, and sends a second signal S2 to the BIOS 100 (S405). After receiving the second signal S2, the BIOS 100 enters an SMI routine so as to enable the operating system to enter a freeze mode, and stops the operation of the hard disk 103 according to the second setting value (S406). If the display module 305 does not operate within the predetermined period of time, the KBC 101 sends an interrupt signal SMI to the BIOS 100 (S412). The BIOS 100 directly enters the SMI routine so as to enable the operating system to enter the freeze mode, and stops the operation of the hard disk 103 according to the second setting value at the same time (S406). The interrupt signal SCI may be a system control interrupt event (SCI event), the first signal may be a notify event, and the second signal may be a command.

Afterward, the BIOS 100 waits for its setting configuration to restore the original first setting value (S407). The KBC 101 monitors the temperature of the hard disk 103 in real time to determine whether the temperature of the hard disk 103 drops to a second predetermined temperature, for example 75° C. (S408). If the temperature of the hard disk 103 does not drop to the second predetermined temperature, return to Step S407, and the BIOS 100 continues waiting for its setting configuration to restore the original first setting value. If the temperature of the hard disk 103 drops to the second predetermined temperature, the KBC 101 sets the setting configuration of the BIOS 100 to the first setting value (S409). The BIOS 100 restores the operation of the hard disk 103 according to the first setting value, and at the same time, exits the SMI routine to enable the operating system to exit the freeze mode (S410). Finally, the display module 305 clears the over-temperature warning message on the display device 306 (S411).

It should be noted that, although the above embodiments of the present invention disclose the first predetermined temperature and the second predetermined temperature, the two temperatures may be equal. That is, the first predetermined temperature is equal to the second predetermined temperature. In other words, only one threshold temperature is defined. In this case, if the KBC detects that the temperature of the hard disk rises to the first predetermined temperature, the setting configuration of the BIOS is set to the second setting value, and the BIOS stops the operation of the hard disk according to the second setting value. Afterward, the temperature of the hard disk drops due to the stop of operation. The KBC continues detecting the temperature of the hard disk. If the KBC detects that the temperature of the hard disk is lower than the first predetermined temperature, the setting configuration of the BIOS is set to the first setting value, and then the BIOS restores the operation of the hard disk according to the first setting value.

What is claimed is:

1. A hard disk temperature monitoring device, suitable for monitoring a temperature of a hard disk in a computer system, comprising:
   a hard disk, storing an operating system;
   a basic input/output system (BIOS), having a setting configuration, wherein when the setting configuration is a first setting value, operation of the hard disk is restored, and when the setting configuration is a second setting value, the operation of the hard disk is stopped;
   a thermal sensor, sensing a temperature of the hard disk; and
   a keyboard controller (KBC), electrically connected to the thermal sensor via a data transmission channel for detecting the temperature of the hard disk, wherein when the KBC detects that the temperature of the hard disk rises to a first predetermined temperature, the setting configuration of the BIOS is set to the second setting value, and the BIOS stops the operation of the hard disk according to the second setting value, wherein if the KBC detects that the temperature of the hard disk rises to the first predetermined temperature, the KBC sends an interrupt signal to the BIOS, and wherein the interrupt signal is a system management interrupt event (SMI event), and after receiving the SMI event, the BIOS enters a system management interrupt routine (SMI routine) to enable the operating system to enter a freeze mode.

2. The hard disk temperature monitoring device as claimed in claim 1, wherein after the BIOS stops the operation of the hard disk, if the KBC detects that the temperature of the hard disk drops to a second predetermined temperature, the setting configuration of the BIOS is set to the first setting value, and the BIOS restores the operation of the hard disk according to the first setting value; the second predetermined temperature is unequal to the first predetermined temperature.

3. The hard disk temperature monitoring device as claimed in claim 1, wherein after the BIOS stops the operation of the hard disk, if the KBC detects that the temperature of the hard disk is lower than the first predetermined temperature, the setting configuration of the BIOS is set to the first setting value, and the BIOS restores the operation of the hard disk according to the first setting value.

4. The hard disk temperature monitoring device as claimed in claim 1, wherein when the BIOS restores the operation of the hard disk, the BIOS exits the SMI routine to enable the operating system to exit the freeze mode.

5. The hard disk temperature monitoring device as claimed in claim 1, further comprising a display module and a display device, wherein the interrupt signal is a system control interrupt event (SCI event).

6. The hard disk temperature monitoring device as claimed in claim 5, wherein after receiving the SCI event, the BIOS sends a first signal to the display module, and then the display module displays an over-temperature warning message on the display device.

7. The hard disk temperature monitoring device as claimed in claim 6, wherein after displaying the warning message, the display module sends a second signal to notify the BIOS to stop the operation of the hard disk.

8. The hard disk temperature monitoring device as claimed in claim 7, wherein after receiving the second signal, the BIOS enters an SMI routine to enable the operating system to enter a freeze mode.

9. The hard disk temperature monitoring device as claimed in claim 8, wherein when the BIOS restores the operation of the hard disk, the BIOS exits the SMI routine to enable the operating system to exit the freeze mode.

10. The hard disk temperature monitoring device as claimed in claim 1, wherein the operation of the hard disk is restored and stopped by restoring and stopping power supply to the hard disk or by restoring and stopping disk rotation of the hard disk.

11. A hard disk temperature monitoring method for monitoring a temperature of a hard disk storing an operating system in a computer system, comprising:

setting a setting configuration in a basic input/output system (BIOS), wherein when the setting configuration is a first setting value, operation of the hard disk is restored, and when the setting configuration is a second setting value, the operation of the hard disk is stopped;

disposing a thermal sensor on the hard disk for sensing a temperature of the hard disk; and detecting the temperature of the hard disk, wherein if the temperature of the hard disk rises to a first predetermined temperature, the setting configuration of the BIOS is set to the second setting value, and the operation of the hard disk is stopped according to the second setting value;

wherein if the temperature of the hard disk rises to the first predetermined temperature, an interrupt signal is sent to the BIOS; and wherein the interrupt signal is a system management interrupt event (SMI event), and after receiving the SMI event, the BIOS enters a system management interrupt routine (SMI routine) to enable the operating system to enter a freeze mode.

12. The hard disk temperature monitoring method as claimed in claim 11, wherein if the temperature of the hard disk drops to a second predetermined temperature after the operation of the hard disk is stopped, the setting configuration of the BIOS is set to the first setting value, and the operation of the hard disk is restored according to the first setting value; the second predetermined temperature is unequal to the first predetermined temperature.

13. The hard disk temperature monitoring method as claimed in claim 11, wherein if the temperature of the hard disk is lower than the first predetermined temperature after the operation of the hard disk is stopped, the setting configuration of the BIOS is set to the first setting value, and the operation of the hard disk is restored according to the first setting value.

14. The hard disk temperature monitoring method as claimed in claim 11, wherein when the operation of the hard disk is restored, the BIOS exits the SMI routine to enable the operating system to exit the freeze mode.

15. The hard disk temperature monitoring method as claimed in claim 11, further comprising disposing a display module and a display device, wherein the interrupt signal is a system control interrupt event (SCI event).

16. The hard disk temperature monitoring method as claimed in claim 15, wherein after receiving the SCI event, the BIOS sends a first signal to the display module, and then an over-temperature warning message is displayed on the display device.

17. The hard disk temperature monitoring method as claimed in claim 16, wherein after the over-temperature warning message is displayed, a second signal is sent to notify the BIOS to stop the operation of the hard disk.

18. The hard disk temperature monitoring method as claimed in claim 17, wherein after receiving the second signal, the BIOS enters an SMI routine to enable the operating system to enter a freeze mode.

19. The hard disk temperature monitoring method as claimed in claim 18, wherein when the operation of the hard disk is restored, the BIOS exits the SMI routine to enable the operating system to exit the freeze mode.

20. The hard disk temperature monitoring method as claimed in claim 11, wherein the operation of the hard disk is restored and stopped by restoring and stopping power supply to the hard disk or by restoring and stopping disk rotation of the hard disk.

* * * * *